March 1, 1949.　　　　B. CHANCE　　　　2,463,245
MAGNETIC COMPASS STABILIZER

Original Filed Jan. 10, 1940　　　　2 Sheets-Sheet 1

Inventor:
Britton Chance
by his Attorneys
Howson & Howson

March 1, 1949. B. CHANCE 2,463,245
MAGNETIC COMPASS STABILIZER

Original Filed Jan. 10, 1940 2 Sheets-Sheet 2

Inventor
Britton Chance
by his Attorneys
Howson & Howson

Patented Mar. 1, 1949

2,463,245

UNITED STATES PATENT OFFICE 2,463,245

MAGNETIC COMPASS STABILIZER

Britton Chance, Mantoloking, N. J.

Original application January 10, 1940, Serial No. 313,283. Divided and this application October 13, 1944, Serial No. 558,521

8 Claims. (Cl. 33—225)

This invention relates to stabilization of a magnetic compass employed on a dirigible craft which is subject to rolling motion tending to influence the compass adversely. More particularly, the invention relates to a novel stabilizing system which is responsive to movement of the compass card due to the craft's roll, and which functions to set up a corrective force counteracting such movement. The present application is a division of my prior application, Serial No. 313,283, filed January 10, 1940, from which issued Patent No. 2,360,330, October 17, 1944.

The invention is particularly applicable to the stabilization of a magnetic compass which forms part of an automatic steering system, and it will be described with particular reference to such a system, although it is to be understood that the invention is applicable generally to the stabilization of a magnetic compass which is subject to rolling motion of a dirigible craft.

The principal object of the invention, therefore, is to provide a novel stabilizing system for a magnetic compass, which is adapted to counteract movement of the compass card due to rolling motion of a dirigible craft on which the compass is employed.

A more specific object of the invention is to provide such a stabilizing system in conjunction with an automatic steering system so as to prevent false operation of the steering system in response to movement of the compass card due to rolling of the craft being steered.

The invention may be fully understood from the following detailed description with reference to the accompanying drawings illustrating a specific embodiment and in which.

Figure 1:
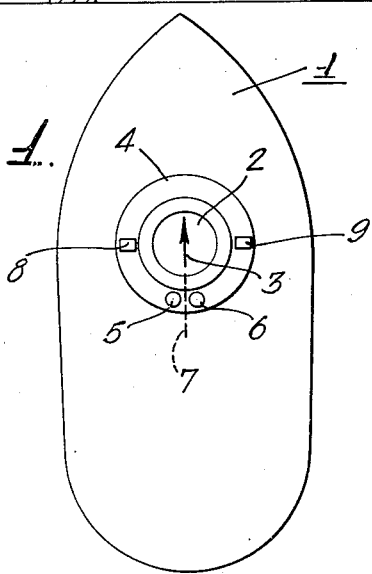
Figs. 1 and 2 are explanatory illustrations by means of which the underlying principle of the invention may be clearly understood.
Figure 2:
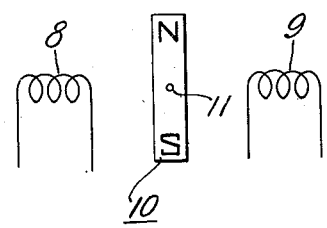

Before discussing the invention in detail, a clear understanding of the purpose and principle of operation of the invention may be had by reference to Figs. 1 and 2. In Fig. 1, there is represented at 1 a dirigible craft which, while shown in the general form of a ship or boat, is intended to be representative of dirigible crafts generally, including aircraft. A magnetic compass card is represented at 2, and the arrow 3 is intended to represent the magnet structure associated with the card 2. As will be understood, the compass card 2 normally remains directionally fixed under the influence of the earth's magnetic field, and the craft 1 moves with respect to the card. At 4, there is represented a support mounted on the craft and carrying light-sensitive cells, such as photo-tubes 5 and 6. A light beam, whose direction is normally fixed, is represented by the broken line 7 extending outwardly from the compass between the cells 5 and 6. As will be seen later, the light beam remains directionally fixed as long as the compass card maintains its normal position. Whenever the craft 1 deviates from its course, one or the other of the light-sensitive cells 5 and 6 is brought into the path of the light beam, thus activating such cell. The selective activation of the light-sensitive cells may be utilized to control an automatic steering apparatus, as is well known in the prior art.

It is a known fact that a magnetic compass is adversely affected by rolling motion of a craft on certain headings, due to inherent dynamical unbalance and frictional forces within the compass structure. As may be seen in Fig. 1, transient rotation of the compass card 2, due to rolling motion of craft 1, may cause the light beam 7 to impinge on one or the other of the light-sensitive cells 5 and 6, depending on the direction of the craft's roll, thereby producing undesired activation of one of the cells. The purpose of the present invention is to minimize the undesirable effects thus produced. In accordance with the invention, there are mounted on the support 4 a pair of electrical coils 8 and 9, which are normally deenergized and which are selectively energized in response to rolling motion of the craft in either direction and also in response to activation of the cells 5 and 6 due to such rolling motion. The manner in which the coils 8 and 9 are selectively energized will be fully described hereinafter.

The coils 8 and 9 are arranged in relation to the magnet structure of the compass so as to produce the desired corrective action. The manner in which this may be accomplished may be seen by reference to Fig. 2 in which the magnet structure of the compass is represented by the bar magnet 10 and the center of rotation of such structure is indicated at 11. The coils 8 and 9 are arranged as illustrated to produce a rotative force on the compass magnet 10 whenever one of the coils is energized. Moreover, the direction of the current applied to each of the coils is such as to properly polarize the magnetic field produced by the coil to counteract rotation of the compass magnet due to roll of the craft. Assume for example that the craft rolls in a direction to cause rotary movement of magnet 10 about its pivot 11 toward the left or counter-clockwise, as viewed in Fig. 2. In accordance with the present invention, the coil 8 is energized at that time by a current of the proper direction to produce a north magnetic pole at the right-hand end of the coil, which repels the north pole of the magnet 10 and quickly restores the magnet to its normal position. When the craft rolls in the opposite direction, causing rotation of the magnet 10 to the right or clockwise, the coil 9 is energized in a manner to produce a north magnetic pole at its left-hand end, thus quickly restoring the magnet 10 to its normal position. Thus the invention operates to produce a corrective magnetic field in proper relation to the compass magnet whenever the craft rolls in one direction or the other.

Figure 3:
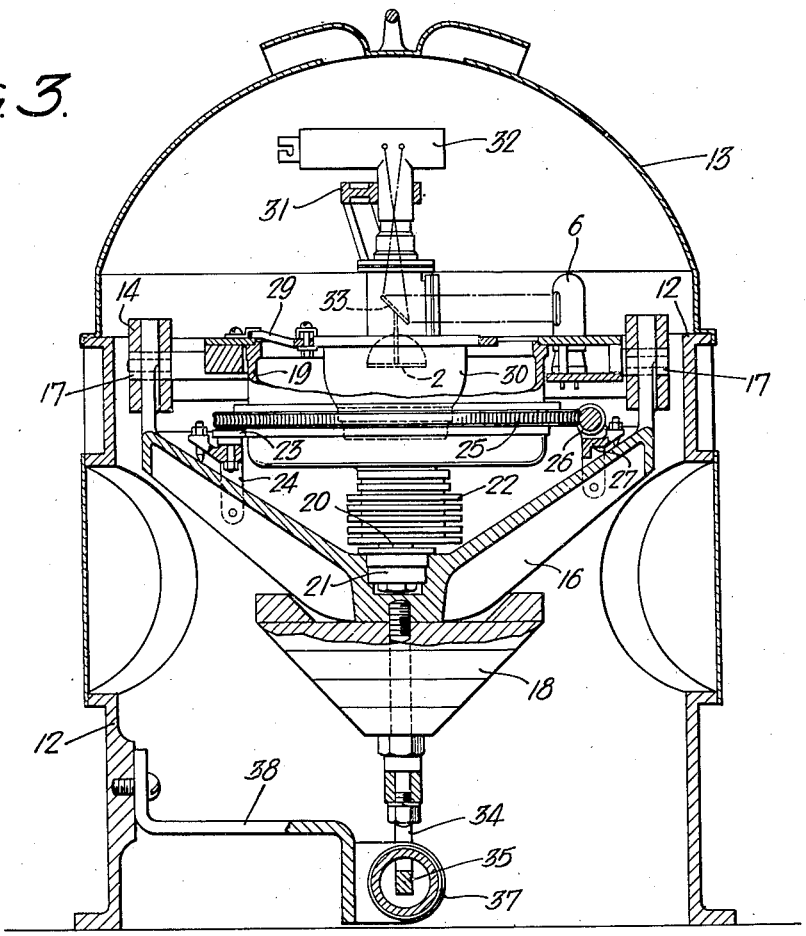
Fig. 3 is a sectional view of a compass binnacle embodying certain elements employed according to the invention.
Figure 4:
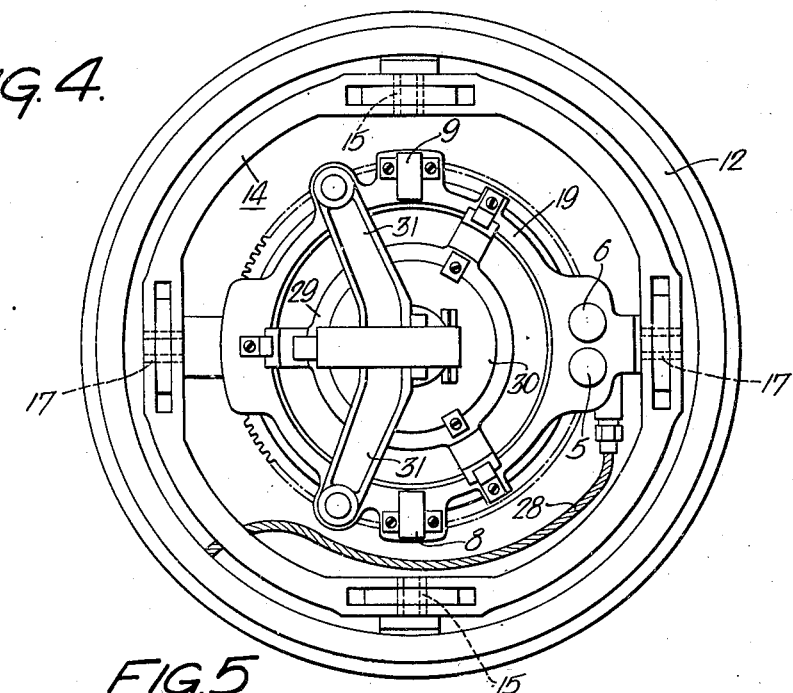
Fig. 4 is a plan view of the binnacle with the cover removed.

Referring now to Figs. 3 and 4, there is illustrated a binnacle structure of the type shown in my prior Patent No. 2,185,074, granted December 26, 1939. This structure comprises a support or housing 12 which is adapted to be readily mounted upon the craft at a predetermined position. A removable cover 13 serves, together with the support or housing, to house the elements of the device. Within the housing thus provided there is mounted a gimbal ring 14 which is attached to the support 12 by means of the opposed pin bearings or journals 15 (see Fig. 4). As shown more clearly in Fig. 3, the gimbal ring 14 carries a suspended member 16 in the form of an inverted hollow cone, which is supported by means of diametrically opposed pin bearings or journals 17. The member 16 is weighted as shown at 18 to maintain it in position and to resist movement due to rolling or other motion of the craft. A cup-shaped member 19 is rotatably supported by member 16, and to this end the member 19 is provided with a centrally-disposed downwardly extending stud or spindle 20 which is rotatably supported on member 16 by means of the bearing structure 21. A slip-ring structure 22 is arranged cooperatively with the spindle 20 and serves to make electrical connection to the electrical elements carried by member 19, as mentioned hereinafter. The side wall of the cup-shaped member 19 is supported by the rollers 23 which are carried upon adjustable brackets 24 secured to member 16. The wall of member 19 carries a worm-wheel 25 which meshes with a worm 26 rotatably carried by an adjustable bracket 27 which is supported by member 16. The worm 26 is driven by a flexible shaft 28, the purpose of which will be explained later.

The light-sensitive devices or photoelectric cells 5 and 6, hereinbefore mentioned, are mounted on the cup-shaped member 19 as shown. A spider 29 is also carried by the cup-shaped member 19 and serves to support the bowl 30 of the magnetic compass. A bracket 31, also carried by the cup-shaped member 19, serves to support a lamp housing 32 in such manner that the lamp within the housing projects a light beam downward substantially in axial alignment with the axis of the compass card 2. A reflecting device or mirror 33 is carried by the compass card and is mounted in substantial alignment with the axis thereof, and this light-reflecting device is adapted to reflect the light beam as shown in Fig. 3. This arrangement provides a reflected beam of light which is normally directionally fixed and which is normally directed between the light-sensitive cells 5 and 6 so that the latter are not normally activated. When the craft deviates from its course in one direction or the other, however, the support 12 moves accordingly, carrying with it the structure above described, including the cup-shaped member 19 and the light-sensitive cells. As a result, one or the other of the cells is moved into the path of the light beam and is thus activated. As previously mentioned, the selective activation of the light-sensitive cells in response to deviation of the craft from its course may be utilized to effect automatic steering, of which more will be said later.

In accordance with the present invention, the electrical coils 8 and 9, hereinbefore mentioned, are mounted on the cup-shaped member or cell carriage 19 (see Fig. 4) in proper relation to the compass magnet to effect the corrective action previously discussed. In further accordance with the invention, there is attached to the lower portion of the binnacle structure a yoke 34 (see Fig. 5) which carries a bar magnet 35 on which two pick-up coils 36 and 37 are freely disposed and are carried by a support 38 mounted on support 12. The magnet 35 and the associated coils 36 and 37 constitute an electromagnetic pick-up device which generates electrical impulses in response to rolling motion of the craft, and these impulses are supplied in amplified form to the coils 8 and 9. The said impulses are generated by relative movement between the magnet 35 and the associated coils 36 and 37, and since the yoke 34 remains substantially stationary (by virtue of the gimbal mounting) while the coil-supporting bracket 38 rolls slightly when the craft rolls, there must be sufficient freedom of motion between the magnet and the coils to permit the necessary movement therebetween. To this end, the openings through the coils, through which the magnet 35 extends, are sufficiently large to permit the necessary relative movement.

In order that the coils 36 and 37 shall move relative to the magnet 35 in response to rolling motion of the craft about its axis of roll, i. e. its longitudinal axis, it is necessary that the electromagnetic pick-up device be properly orientated with respect to said axis. To this end, the magnet 35 and the axis of coils 36 and 37 should be disposed in transverse relation to the craft's axis of roll. The pick-up device may be located in the immediate vicinity of the craft's axis of roll or it may be located remote from said axis. Of course, if the pick-up device is supported by the compass binnacle, as shown, the location of said device will be governed by the location of the binnacle, but the pick-up device may be separate from the compass binnacle, provided the said device has one of its parts gimbaled and the other part mounted for movement in response to rolling motion of the craft. It is immaterial, of course, whether the coils move relative to the magnet or vice versa.

Figure 5:
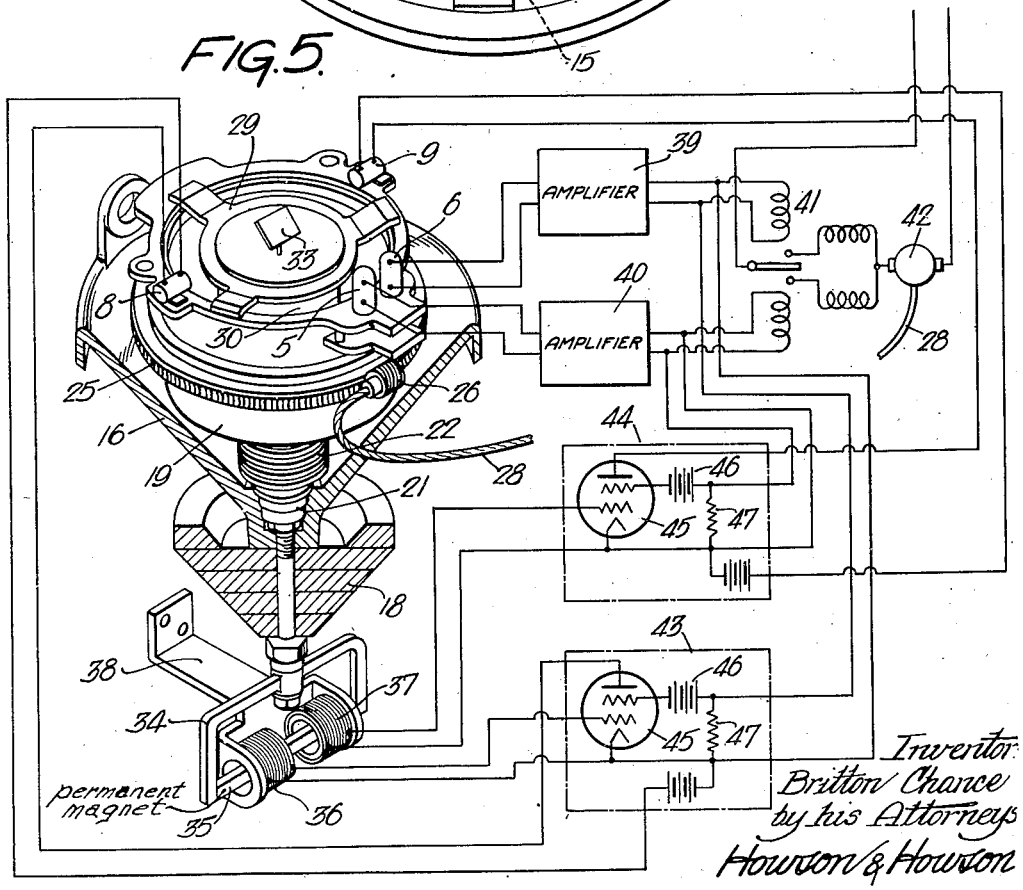
Fig. 5 is a diagrammatic illustration of the complete apparatus in which the invention is embodied.

Referring now to Fig. 5, there is illustrated the complete apparatus or system embodying the structure hereinbefore described. In this illustration the binnacle structure is shown diagrammatically. The light-sensitive cells 5 and 6 are connected to conventional vacuum tube amplifiers 39 and 40, which, in turn, serve to actuate a double acting relay 41, which controls the energization of a reversible motor 42. The motor may serve as a steering motor and may have its armature connected to the steering rudder of the craft. The motor also drives the flexible shaft 28 to effect follow-up action through the worm 26 and the worm-wheel 25. The follow up action, as will be well understood, serves to restore the system to its normal equilibrium position. Thus, when the cell carriage moves in response to deviation of the craft from its course, causing operation of the motor 42, the follow up drive serves to move the cell carriage in the opposite direction to restore equilibrium.

The coils 36 and 37 are connected to the inputs of electronic amplifiers 43 and 44, each of which is normally inoperative but is rendered operative in response to operation of one of the amplifiers 39 and 40. As a simple illustration of the form which each of the amplifiers 43 and 44 may take, there is shown in each instance a screen grid tube 45 which is normally biased to cut-off by a negative potential applied to its screen grid, for example, by means of a biasing voltage source 46. The screen grid circuit in each instance is connected to the output of one of the amplifiers 39—40 and this circuit includes a resistor 47, across which a voltage is produced in response to operation of the associated amplifier. The arrangement is such that the voltage across resistor 47 is of the proper polarity and of sufficient magnitude to overcome the negative bias on the screen grid of tube 45 and thus render the tube operative. Thus, each time one of the light-sensitive cells 5 and 6 is activated, one or the other of the amplifiers 43 and 44 is rendered operative, but no effect is produced thereby unless a pulse is produced by the associated coil 36 or 37 in response to rolling of the craft, as will be more clearly seen later.

While the amplifiers 43 and 44 have been shown in simplified form, they may comprise as many stages as may be necessary to produce sufficient amplification of the pulses from coils 36 and 37. Of course, only one stage need be biased in the manner illustrated. The outputs of amplifiers 43 and 44 are connected respectively to the correcting coils 8 and 9 which are mounted on the cell carriage 19.

Considering the operation of the system, as long as the craft does not roll there will be no relative motion between the magnet 35 and the coils 36 and 37 and therefore no impulse will be applied to the correcting coils 8 and 9, even though the amplifiers 43 and 44 are rendered operative selectively in response to operation of the automatic steering system. Accordingly, the automatic steering system functions in response to deviations of the craft from its course without any effect upon the correcting coils 8 and 9.

If the craft rolls and causes rotation of the compass card 2 sufficiently to move the light beam onto one or the other of the light-sensitive cells 5 and 6, the corresponding amplifier 43 or 44 is rendered operative. At the same time, the rolling motion of the craft produces relative movement between magnet 35 and the coils 36 and 37. This movement generates voltages which are proportional to the velocity of the craft's roll. As a result, the amplifiers 43 and 44 receive impulses, and the amplifier which has been rendered operative supplies an amplified current impulse to the associated correcting coil 8 or 9. Thus, if the craft's roll causes counterclockwise rotation of the compass card 2, as viewed in Fig. 5, the light beam will activate cell 6 thereby rendering amplifier 43 operative. As a result, the impulse received from coil 36 will be amplified and applied to the coil 8, thus restoring the compass card to its original position, as above described with reference to Fig. 2. Rotation of the compass card 2 in the opposite direction will cause activation of cell 5, thus rendering amplifier 44 operative and applying an impulse from coil 37 to the corrective coil 9. In either case, as soon as the light beam leaves the activated cell the controlled amplifier 43 or 44 is rendered inoperative and the energized coil 8 or 9 is deenergized.

The employment of the invention in conjunction with an automatic steering system, as illustrated in Fig. 5, effectively prevents operation of the steering system in response to rolling of the craft, since the correcting system quickly restores the equilibrium or neutral condition of the apparatus before the steering system has had time to operate appreciably. Since the steering system is relatively slow acting and is intended to operate in response to the low frequency yawing motion of the craft, the correcting action takes place before the steering system is enabled to respond to the undesired movement of the compass card.

The invention, substantially as illustrated and described, was applied experimentally to a craft of substantial size and its effectiveness to stabilize a magnetic compass was thus demonstrated.

While the invention has been described with reference to a specific embodiment, it will be understood that other embodiments may be resorted to, and various modifications may be made within the scope of the appended claims.

I claim:

1. Apparatus for stabilizing a magnetic compass on a dirigible craft which is subject to rolling motion, comprising angular displacement-responsive means for producing signals corresponding to the different senses of angular displacement of the compass magnet relative to the craft, a first normally inactive means adapted when activated to produce a magnetic force opposing the angular displacement of the compass magnet in one sense, a second normally inactive means adapted when activated to produce a magnetic force opposing the angular displacement of the compass magnet in the opposite sense, and means responsive to rolling motion of the craft and controlled by said signals to selectively activate the one of said last two means which is adapted to oppose the angular displacement of the compass magnet that caused the controlling signal, subject to correspondence in sense between the deflecting tendency of the rolling motion and the angular displacement of the compass magnet.

2. Apparatus for stabilizing a magnetic compass on a dirigible craft which is subject to rolling motion, comprising angular displacement-responsive means for producing signals corresponding to the different senses of angular displacement of the compass magnet relative to the craft, a first electrical means adapted when energized to produce a magnetic force opposing the angular displacement of the compass magnet in one sense, a second electrical means adapted when energized to produce a magnetic force opposing the angular displacement of the compass magnet in the opposite sense, and means responsive to rolling motion of the craft and controlled by said signals to selectively energize the one of said two electrical means which is adapted to oppose the angular displacement of the compass magnet that caused the controlling signal, subject to correspondence in sense between the deflecting tendency of the rolling motion and the angular displacement of the compass magnet.

3. Apparatus for stabilizing a magnetic compass on a dirigible craft which is subject to rolling motion, comprising angular displacement-responsive means for producing signals corresponding to the different senses of angular displacement of the compass magnet relative to the craft; a first electrical coil adapted when energized to produce a magnetic force opposing the angular displacement of the compass magnet in one sense, a second electrical coil adapted when energized to produce a magnetic force opposing the angular displacement of the compass magnet in the opposite sense, electromagnetic pick-up means responsive to rolling motion of the craft for generating electrical impulses, and means controlled by said signals for transferring said impulses selectively to the one of said coils which is adapted to oppose the angular displacement of the compass magnet that caused the controlling signal, subject to correspondence in sense between the deflecting tendency of the rolling motion and the angular displacement of the compass magnet.

4. Apparatus for stabilizing a magnetic compass on a dirigible craft which is subject to rolling motion, comprising electro-optical means arranged to respond to angular displacement of the compass magnet relative to the craft, said electro-optical means including a pair of light-sensitive devices which are selectively activated in response to angular displacement of the compass magnet in different senses, thereby to produce signals corresponding to the different senses of said displacement, a first electrical means adapted when energized to produce a magnetic force opposing the angular displacement of the compass magnet in one sense, a second electrical means adapted when energized to produce a magnetic force opposing the angular displacement of the compass magnet in the opposite sense, and means responsive to rolling motion of the craft and controlled by said signals to selectively activate the one of said last two means which is adapted to oppose the angular displacement of the compass magnet that caused the controlling signal, subject to correspondence in sense between the deflecting tendency of the rolling motion and the angular displacement of the compass magnet.

5. Apparatus for stabilizing a magnetic compass on a dirigible craft which is subject to rolling motion, comprising electro-optical means arranged to respond to angular displacement of the compass magnet relative to the craft, said electro-optical means including a pair of light-sensitive devices which are selectively activated in response to angular displacement of the compass magnet in different senses, thereby to produce signals corresponding to the different senses of said displacement, a first electrical means adapted when energized to produce a magnetic force opposing the angular displacement of the compass magnet in one sense, a second electrical means adapted when energized to produce a magnetic force opposing the angular displacement of the compass magnet in the opposite sense, means responsive to rolling motion of the craft for generating electrical impulses, and means controlled by said signals for transferring said impulses selectively to the one of said two electrical means which is adapted to oppose the angular displacement of the compass magnet that caused the controlling signal, subject to correspondence in sense between the deflecting tendency of the rolling motion and the angular displacement of the compass magnet.

6. Apparatus for stabilizing a magnetic compass on a dirigible craft which is subject to rolling motion, comprising electro-optical means arranged to respond to angular displacement of the compass magnet relative to the craft, said electro-optical means including a pair of light-sensitive devices which are selectively activated in response to angular displacement of the compass magnet in different senses, thereby to produce signals corresponding to the different senses of said displacement, a pair of amplifiers connected respectively to said devices to amplify said signals, a first electrical means adapted when energized to produce a magnetic force opposing the angular displacement of the compass magnet in one sense, a second electrical means adapted when energized to produce a magnetic force opposing the angular displacement of the compass magnet in the opposite sense, means responsive to rolling motion of the craft for generating electrical impulses, said last-named means including a pair of coils, a pair of normally inoperative amplifiers connected respectively to said coils, means controlled by the first-mentioned amplifiers for selectively rendering the last-mentioned amplifiers operative according to which of said light-sensitive devices is activated, and means connecting said last-mentioned amplifiers to said first and second electrical means respectively so as to selectively energize the latter to oppose the angular displacement of the compass magnet, subject to correspondence in sense between the deflecting tendency of the rolling motion and the angular displacement of the compass magnet.

7. Apparatus for stabilizing a magnetic compass on a dirigible craft subject to rolling motion, comprising a binnacle structure including a magnetic compass which is subject to adverse influence by such motion, angular displacement-responsive means on said binnacle for producing signals corresponding to the different senses of angular displacement of the compass magnet relative to the craft, a first electrical coil on said binnacle adapted when energized to produce a magnetic force opposing the angular displacement of the compass magnet in one sense, a second electrical coil on said binnacle adapted when energized to produce a magnetic force opposing the angular displacement of the compass magnet in the opposite sense, means responsive to the rolling motion of the craft for generating electrical impulses, and means controlled by said signals for transferring said impulses selectively to the one of said coils which is adapted to oppose the angular displacement of the compass magnet that caused the controlling signal, subject to correspondence in sense between the deflecting tendency of the rolling motion and the angular displacement of the compass magnet.

8. Apparatus for stabilizing a magnetic compass on a dirigible craft subject to rolling motion, comprising a binnacle structure including a magnetic compass which is subject to adverse influence by such motion, angular displacement-responsive means on said binnacle for producing signals corresponding to the different senses of angular displacement of the compass magnet relative to the craft, a first electrical coil on said binnacle adapted when energized to produce a magnetic force opposing the angular displacement of the compass magnet in one sense, a second electrical coil on said binnacle adapted when energized to produce a magnetic force opposing the angular displacement of the compass magnet in the opposite sense, electromagnetic pick-up means on said binnacle responsive to the rolling motion of the craft for generating electrical impulses, and means controlled by said signals for transferring said impulses selectively to the one of said coils which is adapted to oppose the angular displacement of the compass magnet that caused the controlling signal, subject to correspondence in sense between the deflecting tendency of the rolling motion and the angular displacement of the compass magnet.

BRITTON CHANCE.

REFERENCES CITED

The following references are of record in the file of this patent:

UNITED STATES PATENTS

| Number | Name | Date |
| --- | --- | --- |
| 1,585,210 | Roux | May 18, 1926 |
| 1,589,673 | Winter | June 22, 1926 |
| 2,185,074 | Chance | Dec. 26, 1939 |
| 2,360,330 | Chance | Oct. 17, 1944 |

FOREIGN PATENTS

| Number | Country | Date |
| --- | --- | --- |
| 666,594 | Germany | Oct. 24, 1938 |